May 1, 1951  W. D. HUNT ET AL  2,551,130
SWING SAW WITH RECTILINEAR MOTION
Filed June 2, 1947  3 Sheets-Sheet 1

Inventors
Walter Duran Hunt
Karl H. Woodbury

By Clarence A. O'Brien
and Harvey B. Jacobson
Attorneys

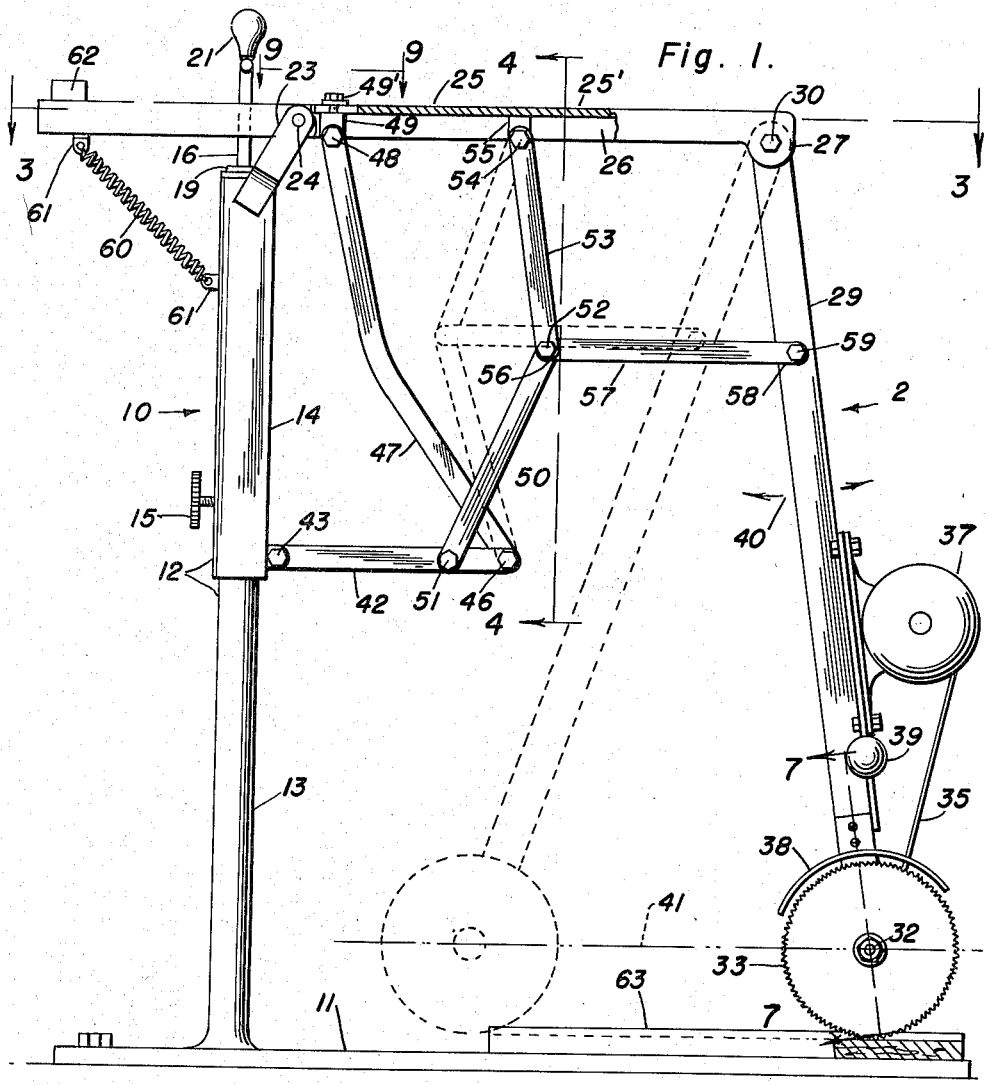
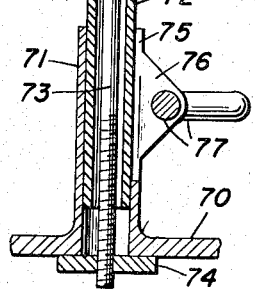

May 1, 1951 W. D. HUNT ET AL 2,551,130
SWING SAW WITH RECTILINEAR MOTION
Filed June 2, 1947 3 Sheets-Sheet 3

Inventors
Walter Duran Hunt
Karl H. Woodbury

By Clarence A. O'Brien
and Harvey B. Jacobson
Attorneys

Patented May 1, 1951

2,551,130

UNITED STATES PATENT OFFICE 2,551,130

SWING SAW WITH RECTILINEAR MOTION

Walter Duran Hunt and Karl H. Woodbury, Riverside, Calif.

Application June 2, 1947, Serial No. 751,848

3 Claims. (Cl. 143—46)

This invention relates to new and useful improvements and structural refinements in swing saws, and the principal object of the invention is to provide a device of the character herein described, wherein the point of contact of the saw with the work reciprocates in a plane parallel to the saw bed, whereby a uniform depth of cut is assured.

A further object of the invention is to provide the swing saw which embodies in its construction linkage of novel design, so as to facilitate performance of the operation above outlined.

Another object of the invention is to provide a swing saw which may be easily adjusted as to height above the saw bed.

An additional object of the invention is to provide a swing saw which is simple in construction, which may be easily and conveniently manipulated, and which will not readily become damaged.

A still further object of the invention is to provide a swing saw which will readily lend itself to economical manufacture and which is otherwise well adapted for the purpose for which it is intended.

With the above more important objects in view and such other objects as may become apparent as this specification proceeds, the invention consists essentially of the construction and arrangement of parts as shown in the accompanying drawings in which:

Figure 1 is a side elevation of the invention;

Figure 8 (Sheet 1) is a cross-sectional view illustrating a modified form of the saw raising and lowering means which may be used in the invention;

Figure 9 is a fragmentary plan view, taken in the direction of the arrows 9—9 in Figure 1, and Figure 10 (Sheet 3) is a cross-sectional detail, taken substantially in the plane of the line 10—10 in Figure 3.

Like characters of reference are used to designate like parts in the specification and throughout the several views.

Figure 3:
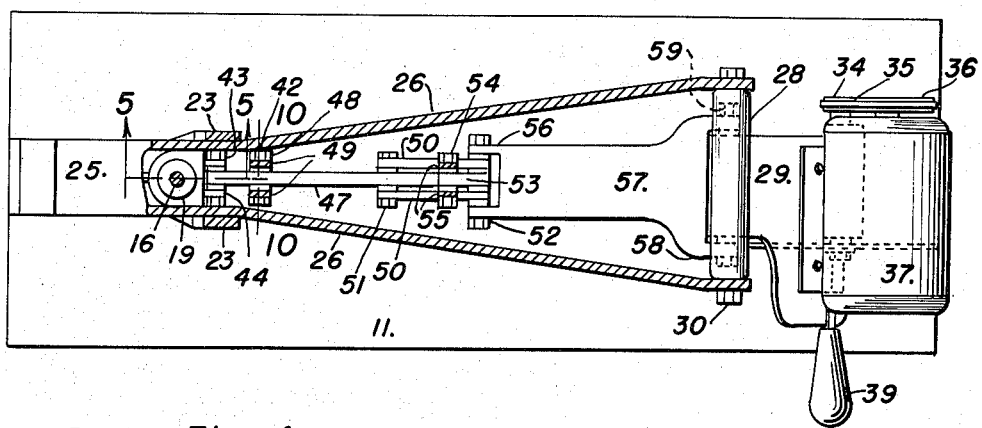
Figure 3 is a cross-sectional view, taken substantially in the plane of the line 3—3 in Figure 1.

Referring now to the accompanying drawings in detail, the invention consists of a swing saw designated generally by the reference character 10, the same embodying in its construction a substantially flat plate forming the saw bed 11, on which is mounted an upwardly extending, vertically adjustable standard 12.

This standard includes a lower portion consisting of a cylindrical rod 13, and an upper portion formed by a tubular extension 14. The rod 13 is slidably telescoped to the lower end of the extension 14 and a suitable set screw 15 is employed for releasably locking the two members (13, 14) together.

The extension 14 may be raised or lowered with respect to the rod 13 by means of a screw threaded shaft 16 which extends through the extension 14 and the lower end portion thereof is freely receivable in a bore 17 provided in the upper end portion of the rod 13. An internally threaded block 18 is rigidly secured to the upper end portion of the rod, said block operatively engaging the rod 16, as will be clearly apparent.

The rod 16 is prevented from longitudinal displacement by means of a pair of collars 19 provided on the rod and engaging the relatively opposite surfaces of the cover plate 20 mounted at the upper end of the extension 14.

The upper end portion of the rod 16 provides what may be referred to as a crank which, in turn, is equipped with a suitable handle 21. Accordingly, it will be found that by simply rotating this crank handle, the extension 14 may be raised or lowered with respect to the standard 13, whereupon, by tightening the set screw 15, the entire structure may be "locked" in any desired position.

It will be also noted that upon loosening the screw 15, the extension 14 may be rotated with respect to the rod 13, so that the position of the saw on the bed may be rotatably adjusted.

The upper end of the extension 14 is equipped with a pair of upwardly projecting brackets 23 which are secured to the extension in any desired manner, such as by welding, or the like. A pivot pin 24 extends transversely through the brackets 23 and a carrier beam 25 is mounted medially of its length on this pin, as is best shown in Figure 1. The beam 25 is substantially U-shaped cross-sectional configuration and the side members 26 at one end portion of the beam are outwardly divergent so as to provide what may be called a yoke 27, best shown in the accompanying Figure 2. The said yoke is adapted to receive the tubular extremity 26 by means of a suitable pin 30.

Figure 2:
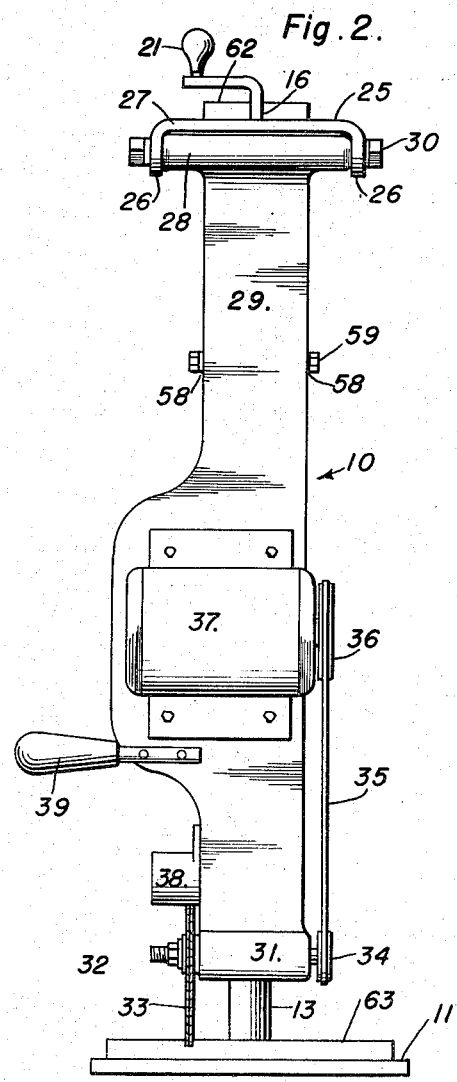
Figure 2 is an end view thereof, taken in the direction of the arrow 2 in Figure 1.
Figure 5:
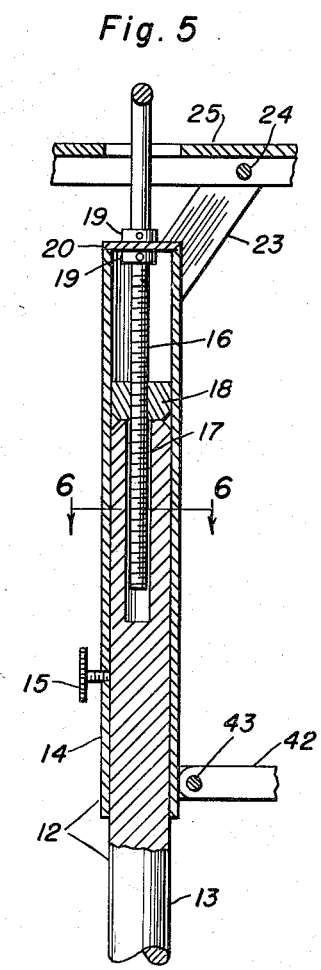
Figure 5 (Sheet 2) is a cross-sectional view, taken substantially in the plane of the line 5—5 in Figure 3.

The configuration of the arm 29 is best illustrated in the accompanying Figure 2, and it will be noted that the lower end portion of the arm provides a tubular bearing block 31 for a rotatable shaft 32, one end of the latter carrying a circular saw 33, while its remaining end is provided with a relatively small pulley.

The pulley 34 is operatively connected by means of an endless belt 35 to the relatively large pulley 36 mounted on the armature shaft of the electric motor 36 which, in turn, is secured intermediate the ends of the arm 29, as will be clearly apparent. If desired, the arm 29 may also carry a suitable guard 38 for the saw 33, and it will be noted that the arm is equipped with a convenient handle 39 whereby the arm, together with the saw 33, may be oscillated in the direction of the arrows 40 while the sawing operation is being performed.

However, it is to be understood that the oscillating movement of the arm 29 is to be regarded as such only with respect to the arm 25, since means are provided to assure that the axis of the shaft 32 reciprocates in a straight plane, namely, that indicated by the line 41 in Figure 1.

In effect, the essence of novelty of the invention resides in the provision of the particular means for achieving this requirement, said means consisting of linkage which will be presently described.

Figure 4:
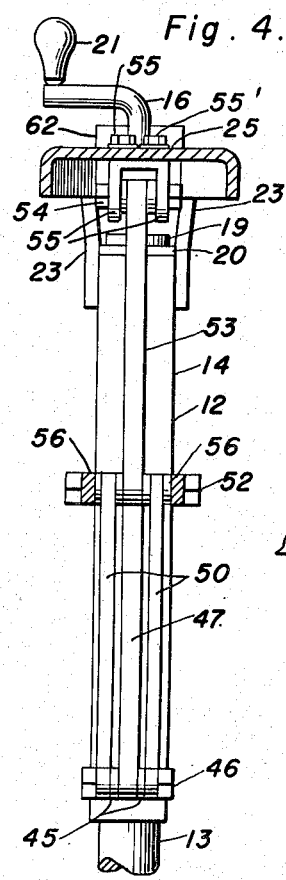
Figure 4 is a cross-sectional view, taken substantially in the plane of the line 4—4 in Figure 1.
Figure 7:
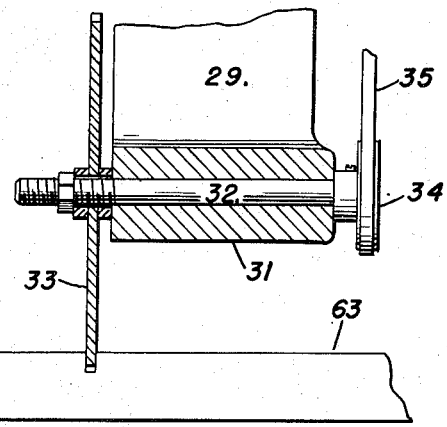
Figure 7 (Sheet 3) is a cross-sectional view, taken substantially in the plane of the line 7—7 in Figure 1.
Figure 10:
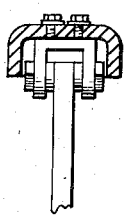
Figure 6:
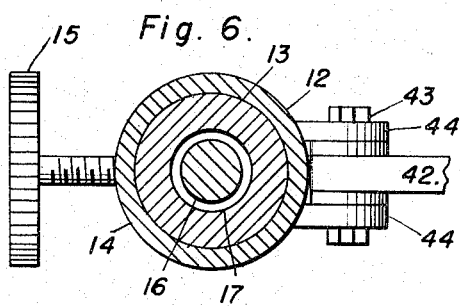
Figure 6 is a cross-sectional view, taken substantially in the plane of the line 6—6 in Figure 5.

This linkage includes a substantially horizontal limb 42 which is pivoted at one end thereof by means of a pin or screw 43 between a pair of blocks 44 (Figure 6), the latter being rigidly secured to the lower end portion of the aforementioned extension 14. The outer end or the remaining end of the limb 42 provides a fork 45 (Figure 4), which, in turn, is pivotally connected as at 46 to one end of an equalizer bar 47.

The remaining end of the arm 47 is pivoted as at 48 to a substantially U-shaped bracket 49, which, in turn, is adjustably secured to the underside of the beam 25 by means of two screws 49' positioned in a pair of slots 25' (Figure 9) with which the beam is provided. A pair of links 50 are also pivoted as at 51 intermediate the ends of the limb 42, the remaining ends of the link 50 being pivoted as at 52 to one end of a further link 53. The remaining end of the latter is pivoted as at 54 to a further U-shaped bracket 55 (similar to the aforementioned bracket 49), which is secured to the underside of the beam 25.

It will be noted that the pivotal connection between the links 50, 53, is straddled by a forked extremity 56 of a coupling rod 57, best illustrated in Figure 3. The remaining forked extremity 58 of this rod straddles the arm 29 and is pivotally connected thereto as is indicated at 59.

A tension spring 60 extends between the pair of lugs 61 provided on the extension 14 and adjacent the outer end of the beam 25, and if desired, a suitable counter weight 62 may be placed on the beam, as is indicated in Figure 1. The purpose of the spring 60 and of the weight 62 is to counter-balance to some extent, the various parts mounted or supported by the relatively opposite end of the beam 25.

Accordingly, when the invention is placed in use, it will be found that the action of the various links, etc., is such that an oscillating motion imparted to the arm 29 in the direction of the arrow 40 will be converted to a straight line reciprocating motion of the saw 33, that is to say, the axis of the saw shaft 32 will move in the straight plane indicated at 41 in Figure 1. Furthermore, it will be found that the plane 41 is parallel to the surface of the saw bed 11, so that when a board, or the like, indicated at 63, is positioned on the bed, the cutting depth of the saw will be uniform and constant throughout the length of cut.

Needless to say, the relative positioning of the pivot pins or screws 43, 46, 48, 51, 52, 54, 59, 30, and 24, as well as the relative position of the shaft 32 should be such as to facilitate the maintenance of uniform cutting, as above described, and a certain amount of adjustment of the beam linkage will be facilitated by moving the bracket 49, as will be clearly understood.

Referring now to the modified embodiment of the invention illustrated in the accompanying Figure 8, the same pertains to the modified means for raising and lowering the extension 14 with respect to the rod 13, the modified embodiment including the saw bed 70 provided with a tubular, upwardly extending standard portion 71.

The tubular standard extension 72 is slidably received in the portion 71, and a shaft 73, screw threaded at the lower end portion thereof, is positioned in the extension 72, as will be clearly apparent.

The screw threaded portion of the shaft 73 operatively engages an internally threaded block 74 secured to the underside of the bed 70, and it will be noted that by simply rotating the shaft 73, the extension 72 may be raised or lowered with respect to the standard portion 51, as desired. It should, of course, be understood that the upper end of the shaft 73 is equipped with suitable collars, similar to the aforementioned collar 19, whereby the longitudinal displacement of the shaft with respect to the extension 52 is prevented.

Finally, the standard portion 71 may be formed with a longitudinally extending, open-ended slot 75 and may be provided with a pair of ears 76 at the edges of this slot, a suitable clamping member 77 being employed for urging the two ears together. In this manner, the standard portion 71 may be effectively "tightened" upon the extension 72, whereby the two parts are effectively locked together, as is accomplished by the use of the set screw 15 in the embodiment previously described.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

What we claim as our invention is:

1. In a swing saw, the combination of an upright standard, a carrier beam pivotally mounted at the upper end of said standard for raising and lowering movement, an oscillatory saw supporting arm pivoted to a free end portion of said beam and extending downwardly therefrom, and means responsive to the oscillation of said arm for raising and lowering said beam whereby the lower end of the arm may reciprocate in a substantially horizontal plane, said means comprising a vertically swingable, substantially horizontal limb pivoted to an intermediate portion of said standard, a coupling rod pivoted at one end to an intermediate portion of said arm, a pair of links pivotally connected to the remaining end of said rod, the free end of one link being pivoted to said beam, the free end of the remaining link being pivoted to said limb, and an equalizing bar having one end thereof pivoted to said limb, the remaining end of said bar being pivoted to said beam.

2. In a swing saw, the combination of an upright standard provided at its upper end with a horizontal fulcrum, a carrier beam having its intermediate portion mounted on said fulcrum for raising and lowering movement, an oscillatory arm pivoted to one free end of said beam and extending downwardly therefrom, a rotary saw mounted at the lower end of said arm, and means responsive to oscillation of said arm for raising and lowering said beam whereby the saw supporting end of the arm may reciprocate in a substantially horizontal plane, said means comprising a vertically swingable, substantially horizontal limb pivoted at one end thereof to an intermediate portion of said standard, a coupling rod pivoted at one end to an intermediate portion of said arm, a pair of links pivoted at one end to the remaining end of said rod, the remaining end of one link being pivoted to said beam at a point between said arm and said fulcrum, the remaining end of the second link being pivoted to a free end portion of said limb, and an equalizing bar pivoted at one end thereof to the free end portion of said limb and having its remaining end pivoted to said beam at a point adjacent said fulcrum.

3. The device as defined in claim 2 together with means for urging said beam to a raised position, said means including a counterweight provided on the remaining free end portion of the beam.

WALTER DURAN HUNT.
KARL H. WOODBURY.

REFERENCES CITED

The following references are of record in the file of this patent:

UNITED STATES PATENTS

| Number | Name | Date |
|---|---|---|
| 2,290,394 | Vanderveld | July 21, 1942 |
| 2,302,356 | Taylor | Nov. 17, 1942 |

FOREIGN PATENTS

| Number | Country | Date |
|---|---|---|
| 219,584 | Great Britain | July 31, 1924 |